US005472639A

United States Patent [19]

Yao

[11] Patent Number: 5,472,639

[45] Date of Patent: Dec. 5, 1995

[54] ELECTROCONDUCTIVE FOAMS

[75] Inventor: Peter C. Yao, Pickerington, Ohio

[73] Assignee: The Dow Chemical Company, Midland, Mich.

[21] Appl. No.: 107,184

[22] Filed: Aug. 13, 1993

[51] Int. Cl.$^6$ .................................. H01B 1/20; C08J 9/35

[52] U.S. Cl. .......................... 252/500; 252/510; 252/511; 252/512; 521/82; 521/85; 521/89; 521/99; 521/105; 521/121; 524/165; 524/184; 524/419; 524/439; 524/496

[58] Field of Search .................................... 252/500, 511, 252/512, 510; 521/82, 85, 89, 99, 105, 121, 155, 156, 157, 165, 184, 419, 439, 440, 441, 496

[56] References Cited

U.S. PATENT DOCUMENTS

| | | | |
|---|---|---|---|
| 3,733,385 | 5/1973 | Reddish | 252/511 |
| 4,231,901 | 11/1980 | Berbeco | 252/511 |
| 4,301,040 | 11/1981 | Berbeco | 252/511 |
| 4,351,745 | 9/1982 | Stinger | 252/511 |
| 4,359,411 | 11/1982 | Kim et al. | 252/500 |
| 4,391,741 | 7/1983 | Masamoto et al. | 252/511 |
| 4,391,952 | 7/1983 | Lybrand | 252/333.7 |
| 4,395,362 | 7/1983 | Satoh et al. | 252/511 |
| 4,421,678 | 12/1983 | Mehta | 252/51 |
| 4,431,575 | 2/1984 | Fujie et al. | 252/502 |
| 4,481,131 | 11/1984 | Kawai et al. | 252/511 |
| 4,493,788 | 1/1985 | Fujie et al. | 252/511 |
| 4,519,963 | 5/1985 | Yoshida et al. | 264/45.3 |
| 4,525,297 | 6/1985 | Yamane et al. | 252/511 |
| 4,526,707 | 7/1985 | Kutsuwa et al. | 252/511 |
| 4,526,952 | 7/1985 | Zeitler et al. | 524/496 |
| 4,579,902 | 4/1986 | O'Brien | 524/496 |
| 4,588,855 | 5/1986 | Kutsuwa et al. | 174/120 |
| 4,596,669 | 6/1986 | Kleiner et al. | 252/511 |
| 4,617,325 | 10/1986 | Knobel et al. | 521/105 |
| 4,618,630 | 10/1986 | Knobel et al. | 521/105 |
| 4,621,106 | 11/1986 | Fracalossi et al. | 521/130 |
| 4,629,585 | 12/1986 | McCracken et al. | 252/511 |
| 4,655,964 | 4/1987 | Steinberger et al. | 252/511 |
| 4,702,860 | 10/1987 | Kinderov et al. | 525/511 |
| 4,719,039 | 1/1988 | Leonardi | 252/511 |
| 4,731,199 | 3/1988 | Matsuo et al. | 252/511 |
| 4,774,024 | 9/1988 | Deep et al. | 252/511 |
| 4,795,592 | 1/1989 | Lander et al. | 252/511 |
| 4,795,763 | 1/1989 | Gluck et al. | 521/99 |
| 4,800,126 | 1/1989 | Leonardi | 428/420 |
| 4,818,437 | 4/1989 | Wiley | 252/511 |
| 4,824,871 | 4/1989 | Shinomura | 521/53 |
| 4,849,133 | 7/1989 | Yoshida et al. | 252/511 |
| 4,909,960 | 3/1990 | Watanabe et al. | 252/511 |
| 4,929,388 | 5/1990 | Wessling | 252/500 |
| 4,933,107 | 6/1990 | Watanabe et al. | 252/511 |
| 4,954,548 | 9/1990 | Klingensmith | 524/258 |
| 4,971,726 | 11/1990 | Maeno et al. | 252/511 |
| 5,082,870 | 1/1992 | Fukuda et al. | 521/99 |
| 5,149,722 | 9/1992 | Soukup | 521/99 |
| 5,210,105 | 5/1993 | Paquet et al. | 521/99 |
| 5,322,874 | 6/1994 | Fujii et al. | 524/439 |
| 5,340,844 | 8/1994 | Welsh et al. | 521/82 |
| 5,373,026 | 12/1994 | Bartz et al. | 521/99 |
| 5,397,808 | 3/1995 | Doerge et al. | 521/99 |

FOREIGN PATENT DOCUMENTS

| | | |
|---|---|---|
| 464469 | 1/1992 | European Pat. Off. . |
| 55-003951 | 6/1978 | Japan . |
| 57-141431 | 2/1981 | Japan . |
| 59-006255 | 7/1982 | Japan . |
| 61-037828 | 7/1984 | Japan . |
| 62-081430 | 10/1985 | Japan . |
| 62-112636 | 11/1985 | Japan . |
| 63-051455 | 8/1986 | Japan . |
| 2-20536 | 1/1990 | Japan . |

OTHER PUBLICATIONS

3M, Industrial Chemical Products Division, Material Safety Data Sheet for FC–98, Nov., 1985, Document No. 10–3797–7, 2 pages.

3M, Industrial Chemical Products Division, Material Safety Data Sheet for FC–124, Jul., 1986, Document No. 10–3803–3, 2 pages.

Columbian Carbon, "Chemical and Physical Properties Industrial Carbon Blacks", Data Sheet, Undated, 1 page.

Cabot Corporation, Special Blacks Division, "Cabot Carbon Blacks for Ink, Paint, Plastics, Paper" (Technical Report S–36), Oct. 1979, 6 pages.

Cabot Corporation, Special Blacks Division, "Performance of Conductive Carbon Blacks in a Typical Plastics System", (Special Blacks Technical Service Report S–24), Bulletin based upon paper presented at ACS, Aug. 27–29, 1973, 24 pages.

*Primary Examiner*—Anthony Green

[57] ABSTRACT

A lightweight, electroconductive foam comprising an effective amount of a conductive ionic salt, a polymer capable of complexing said conductive ionic salt and an effective amount of particulate conductive material such as carbon black or metal is disclosed. Additionally, a method of preparing a lightweight electroconductive foam having a surface resistivity less than about $10^{10}$ ohms per square by an extrusion process is disclosed. Foams of the present invention exhibit relatively high conductivities yet require only relatively low amounts of particulate conductive material.

23 Claims, No Drawings

ELECTROCONDUCTIVE FOAMS

BACKGROUND OF THE INVENTION

This invention relates to foamed, lightweight, electrically conductive, polymeric materials. Electroconductive foams have widespread application in the packaging of electronic devices due in part, to the ability of such foams to dissipate static electricity. As electronic circuitry is miniaturized, it becomes increasingly susceptible to damage from electrostatic discharge (ESD) since the level of voltage which may permanently impair or destroy circuitry decreases as the physical size of circuitry is reduced. Thus, the range of voltages which may damage circuitry is now typically in the realm of voltages associated with ESD. Damage from ESD has been estimated to cost the electronics industry billions of dollars annually, and is expected to increase as further circuitry miniaturization occurs.

There are primarily two mechanisms by which materials conduct electricity; ionic conduction and metallic conduction. Typical metallic conductors include metals (e.g. in the form of wire, films or fibers) and conductive carbon black. Metallic conduction requires the presence of an electrically conductive pathway through the material. Continuity is a critical factor in establishing metallic conduction. That is, physical contact or very near proximity between the conductive particles must occur for electrons to pass through the material. Thus, in a polymer matrix loaded with carbon black particles, the particles must touch or nearly touch one another in order to provide an electrically conductive pathway through the material.

Prior artisans have utilized foams containing electrically conductive particles such as carbon black dispersed throughout the foam. However in order to obtain an adequately conducting foam, carbon black concentrations in the range of 10 to 25 percent by weight (based upon the total weight of the foam) are often required. Carbon black loadings up to 40 percent and higher have even been described as in U.S. Pat. Nos. 4,231,901 to Berbeco and 4,481,131 to Kawai et al. It is only at such high concentrations that the particles contact one another or are sufficiently close to one another to provide an electrically conductive pathway through the foam matrix.

It is not desirable to have such high concentrations of conductive particles in foams for several reasons. First, the higher the concentration of particles in the foam, the greater the cost of materials and processing. Second, when attempting to foam polymeric resins containing such high particle concentrations, it is difficult to extrude the resin due to the resin's poor melt viscoelasticity and the tendency for particle agglomeration. Third, the resulting foams have relatively high densities rendering them undesirable for packaging and shipping applications. Fourth, the particles near the surface of these foams tend to slough from the foam surface during fabrication and handling, thereby increasing the risk of contamination of electronic devices if the foam is used for packaging or in the vicinity of sensitive components.

The second mechanism by which a material may conduct electricity is ionic conduction. These systems rely on ionic charge carriers for electron transfer, and as such the charge carrier population, capacity, and velocity are critical factors which affect the conductivity of the material under consideration. Moreover, many of these factors are further dependent upon other criteria. For instance, the population or concentration of charge carriers depends upon the extent of dispersion, distribution and solubilization of the particular ionizable compound(s) in the host material. In addition to the complexity and unpredictability of ionic conduction, such systems are much slower than metallic systems since electron transfer occurs via ionic carriers as opposed to the near speed of light displacement of electrons along the conductive pathway in metallic conduction systems.

An example of ionic conduction in polymeric materials is the application of topical treatments to the outer surface of the polymeric material, or the use of additives which migrate to the material surface to provide electrical conductivity on the surface or skin of the material. Examples of such surface active additives include quaternary ammonium salts, or other fatty amines, glycols, and sulfonates. For systems of this type, the conductivity properties as measured along the outer surface of the polymeric material are often very good. However, such surface active additives do not affect the volume resistivity of the material, i.e. the conductivity as measured across a cross section of the material. Moreover, foams having such surface active additives suffer from a variety of drawbacks such as; the conductivity of the foamed material tends to decrease over time, the conductivity is often significantly dependent upon humidity, the degree of conductivity is typically nonuniform, and the foam tends to be corrosive to sensitive electronics due to the presence of the additive(s).

Some foams contain a hygroscopic antistatic additive which functions to reduce surface resistivity by migrating to the foam surface and attracting moisture from the surroundings. Antistatic properties of the foam skin are excellent, however the conductivity as measured across a cut surface of the foam is only marginal. Since moisture is one of the essential components in forming a thin electrolyte layer on the material outer surface, antistatic foams made with the additive may perform poorly at low relative humidity. Additionally, the additive may cause contamination of adjacent devices or materials and be incompatible with some polymeric resins.

Prior artisans have attempted to avoid many of the problems encountered in the prior art associated with ionic conduction systems by utilizing complexes of ionizable salts and oxygen-containing polymeric materials to achieve electrical conductivity, such as described in U.S. Pat. Nos. 4,617,325 and 4,618,630 to Knobel et al., assigned to the Dow Chemical Co. and 4,359,411 to Kim et al. Although such compositions generally provide improved electrical conductivity and moisture dependency, such compositions do not exhibit surface resistivities of less than $10^{10}$ ohms per square.

Thus, the need exists for a lightweight foam which has a surface resistivity less than $10^{10}$ ohms per square, and which has a relatively low concentration of conductive particles thereby avoiding the problems experienced with prior art compositions containing relatively high concentrations of conductive particles such as relatively high material and processing costs, difficult manufacturing aspects, relatively high densities even after foaming, and detrimental sloughing of conductive particles from the foam surface.

Moreover, it has been found that it is difficult if not impossible to produce foams having large cross-sectional areas by extrusion processes if the resin contains a relatively high concentration of carbon black particles. Thus, the need exists for a method of producing an electroconductive foam having a surface resistivity of less than $10^{10}$ ohms per square by an extrusion process.

In addition, the need exists for an electroconductive foam which avoids many of the problems encountered by prior artisans when utilizing ionic conduction systems in foams such as decreasing conductivity over time, significant dependence of conductivity upon humidity, nonuniform conductivity, and corrosiveness of such foams due to the relatively high levels of additives in the foams.

SUMMARY OF THE INVENTION

The lightweight eletroconductive foam of the present invention comprises an effective amount of a conductive ionic salt, a polymer capable of forming a complex with the conductive ionic salt, and an effective amount of particulate conductive material.

DESCRIPTION OF THE PREFERRED EMBODIMENT

In the preferred embodiment, from about 5 to about 15 percent by weight of a conductive ionic salt and from about 5 to about 10 percent by weight of conductive carbon black, conductive metal or mixtures thereof are blended with a polymer capable of complexing the salt and optionally further blended with one or more additional polyolefins, and expanded to produce a lightweight, electroconductive foam.

The preferred embodiment foam of the present invention has a density of between about 0.6 pcf (pounds per cubic foot, 9.61 Kg/m$^3$) to about 12.0 pcf (192.2 Kg/m$^3$) and exhibits a surface resistivity of less than about $10^{10}$ ohms. The phrase "surface resistivity" as used herein refers to the resistance to the flow of electricity as measured between opposite sides of a square on the surface of a sample. The value when expressed in ohms is independent of the size of the square and the thickness of the surface film. The surface resistivity values as described herein are measured in accordance with ASTM test method D257.

The present invention utilizes a polymer which is capable of complexing the conductive ionic salt. In particular, this polymer is one in which there is a polarity or charge separation across the molecule or portions of the molecule. Although not wishing to be bound to any particular theory, it is believed that when the conductive ionic salt is dissolved in a suitable medium containing a polymer capable of complexing the salt, the salt dissociates and the salt cations migrate toward and are retained by the portion or group of the polymer having a negative charge. The salt anions are then relatively free to function as charge carriers and transfer electrons from one location in the medium to another. By utilizing charge carriers, the concentration of the particulate conductive material may be significantly reduced while still achieving the same static electricity dissipation characteristics. The mobile charge carriers are believed to transfer electrons between the relatively stationary, conductive particles. In the absence of these charge carriers, much higher concentrations of particulate conductive materials are necessary so that the distances between neighboring particles are within the range of direct electron transfer between conductive particles. Thus, the function of the complexing polymer is at least twofold. First, the complexing polymer induces dissociation of the ionic salt. Secondly, once the salt has disassociated into its respective ions, the negatively charged groups or portions of the polymer attract the salt cations and form a relatively stable complex. In many instances and as described in greater detail below, the medium for dissolving the salt may be comprised of entirely the complexing polymer or blends of the complexing polymer and other polymeric materials.

The preferred polymer for complexing the conductive ionic salt is a copolymer of ethylene and carbon monoxide (herein referred to as ECO). Typical amounts of the carbon monoxide group in the ECO copolymer may range from about 1 to about 45 mole percent and preferably from about 10 to about 20 mole percent of the ECO copolymer. The ECO copolymer is preferred since it readily complexes with the ionic salt. Commercially available ECO copolymers are sold under the designations ECO XU 60766.02L (10 mole percent CO) by Dow Chemical Co. of Midland, Mich. and ECO E-36017-139 (15 percent CO) by Du Pont de Nemours, E. I. & Co. of Wilmington, Del.

In the case of an ECO copolymer, the polarity of the polymer primarily results from the CO group of the polymer having a negative charge relative to the remaining portion of the molecule. When a conductive ionic salt is dissolved in the polymeric medium, the positively charged salt cation is attracted to one or more CO groups of the polymer thereby forming a complex. As a result of attraction between the oppositely charged species, the salt cation is generally retained by the CO group. Depending upon the salt, a complex between the salt cation and one or more CO groups may be formed, often involving CO groups from adjacent polymer molecules. The free salt anion is believed to function as a charge carrier and transfer electrons between neighboring particles of conductive material. These charge carriers in essence, provide a bridge or electrical pathway between the conductive particles.

In addition to or in place of ECO other polymers containing polar groups such as ethers, esters, amides and urethanes which are capable of forming complexes with the ionic salts described herein are envisaged for use in the present invention. Polyvinyl chlorides and aldehydes may also be operable as ionic salt complexing polymers. In addition to a polymer which is capable of forming a complex with the ionic conductive salt, one or more polyolefins may be used in the resin to be foamed. Since these other polyolefins do not necessarily have to aid in complexing the salt, they may be selected in view of their properties and effect upon both the resin and resulting foam. Examples of polyolefins which may be used in conjunction with the polymer capable of complexing the ionic salt include low density polyethylene, medium and high density polyethylene, polypropylene, polybutene-1, a copolymer of ethylene or propylene and other copolymerizable monomer, for example, propyleneoctene-1-ethylene copolymer, ethylene-propylene copolymer, ethylene-vinyl acetate copolymer, ethyleneacrylic acid copolymer, ethylene-ethyl acrylate copolymer and ethylene-vinyl chloride copolymer. In addition ionomer resins (generally comprising a copolymer of ethylene and a vinyl monomer with an acid group) may be utilized. An example is SURLYN 8660, available from Du Pont. Other polyolefins may also prove useful in the preferred embodiment resins.

One factor guiding the selection of the choice of polymer or polymers for use in the present invention is the melt index of the resulting polymeric resin. The "melt index" is the viscosity of a thermoplastic polymer at a specified temperature and pressure and is a function of the molecular weight of the polymer. Specifically, the melt index is defined as the number of grams of a particular polymer that can be forced through a 0.0825 inch (0.209 cm) orifice in 10 minutes at 190° C. by a pressure of 2160 grams. ASTM D1238 describes measuring the flow rate or melt index of a material. The preferred polymeric resin for use in the present invention should have an overall melt index of from about 0.5 to about 5.0 and preferably from about 1.0 to about 3.0.

It has been found that such melt index values may generally be obtained by employing a blend of an ECO copolymer having a melt index of from about 0.3 to about 20.0, and one or more other polymers such as polyethylene, having a melt index of from about 0.3 to about 7.0.

The ionic salt for use in the preferred embodiment may be nearly any conductive ionic salt that is compatible with the polymeric resin selected. The preferred ionic salt for use in the present invention is sodium tetraphenylboron (STPB) (also known as sodium tetraphenylborate), available from Aldrich Chemical Co., Inc. of Milwaukee, Wis. Other suitable salts include FC-124 FLUORAD and FC-98 FLUORAD, available from 3M of St. Paul, Minn. FC-124 is a lithium perfluoroalkane sulfonate salt and FC-98 is a potassium perfluoroalkyl sulfonate salt. It may be desirable to utilize these salts in relatively high temperature applications as they are more stable than STPB at elevated temperatures. Representative examples of other ionic salts for use in the present invention include sodium thiocyanate, sodium trifluoromethanesulfonate and lithium trifluoromethanesulfonate. It is envisioned that other salts having lithium, potassium, sodium or other analogous cations may be utilized in the present invention so long as the salt selected has a bulky anion to complex with the ECO copolymer.

The amount of ionic salt present in the foam of the preferred embodiment may be any amount which, when taken in conjunction with the concentration of CO units of the ECO copolymer and the particulate conductive material, renders the foam sufficiently conducting to thereby dissipate static electricity. This amount of ionic salt is referred to herein as "an effective amount". The preferred concentration range of the ionic salt added to the polyolefin resin may vary from about 0.5 to about 15 percent and most preferably from about 6 to about 10 percent by weight based upon the total foam weight. The amount of ionic salt added depends upon the physical and conductive properties desired for the foam product. Usually, increasing the concentration of the ionic salt decreases the amount of conductive carbon black particles required to achieve the same degree of conductivity.

The particulate conductive material may be nearly any electrically conductive material, preferably in particulate form. The preferred conductive material is conductive carbon black of any suitable grade. The most preferred conductive carbon black is KETJEN Black 300J and 600J available from Akzo Chemie America of Chicago, Ill. Other suitable types of commercially available electrically conductive carbon black include VULCAN XC-72R available from Cabot Corp. of Boston, Mass. and CONDUCTEX SC from Columbian Carbon Co. of Atlanta, Ga. The amount of particulate conductive material present in the foam of the preferred embodiment may be any amount which, when taken in conjunction with the concentration of CO units of the ECO copolymer and ionic salt, renders the foam sufficiently conducting to thereby dissipate static electricity. This amount of particulate conductive material is referred to herein as "an effective amount." The amount of carbon black added to the polymeric resin is preferably from about 5 percent to about 10 percent by weight of the total foam weight. Greater or lesser amounts of conductive carbon black may be utilized depending upon the degree of conductivity desired for the foam and the amount of ionic salt used.

Other conductive particles may be used in addition to or in place of the carbon black. Examples of such other conductive particles include finely divided metal particles, such as silver, aluminum and salts thereof such as aluminum silicate. Although it is preferred to utilize conductive carbon black in the form of finely divided particles, it is further envisaged that this conductive component could be in the form of strands, fibers, or flakes dispersed or distributed throughout the foam matrix. Accordingly, the same is envisaged for other conductive materials besides carbon black such as metal or salts thereof as described above.

In addition to the above mentioned components, other components may be added to the foamable resin such as pigments, polymerizing agents, stabilizers, antioxidants, antimicrobials, flame retardants, fragrances, impact modifiers, lubricants, platicizers and colorants. Moreover, the present inventor envisages that conductivity enhancers such as KENAMIDE S180 (stearylstearamide), available from Humko Chemical Div., Witco Chemical Corp. of Memphis, Tenn., may be added to the polymeric resin in accordance with U.S. Pat. No. 4,431,575 to Fujie et al., assigned to Dow Chemical Co.

Once the components are added together and uniformly mixed, the composition may be foamed by conventional methods to produce either an open or a closed cell foam. For instance, there can be employed a continuous extrusion method wherein the resin composition of the present invention is heated and melted, a blowing agent is blended into and admixed with the molten resin composition at an elevated temperature and the resulting foamable blend is extruded to a low pressure zone for foaming. Alternatively, a batch type method may be employed wherein a blowing agent is added to the resin composition at an elevated temperature under high pressure and the pressure is reduced for foaming.

Extrusion foaming is preferred since such process generally allows formation of products having larger cross sections than other comparable processes. The present invention may in addition enable the practitioner to utilize particular extrusion foaming processes, many of which are not suitable with resins containing high concentrations of carbon black. The resulting electroconductive foams preferably have densities of from about 0.6 pcf to about 12.0 pcf. The preferred cell size of the foams of the present invention is from about 0.7 to about 2.5 millimeters.

The blowing agent for use in foaming the resin composition of the present invention is an ordinary chemical blowing agent or a volatile blowing agent. Preferably, a volatile organic blowing agent is recommended and there may be used any one or more having a boiling point lower than the melting point of the polymeric resin. Typical blowing agents include lower hydrocarbons such as propane, butane, isobutane, pentane, hexane, and halogenated hydrocarbons such as methylene chloride, methyl chloride, trichlorofluoromethane (CFC 11), chlorofluoromethane (CFC 22), dichlorofluoromethane (CFC 21), chlorodifluoromethane, tetrafluoromethane (CFC 14), chlorotrifluoromethane (CFC 13), dichlorodifluoromethane (CFC 12), 1,1-difluoroethane (HFC 152a), 1-chloro-1,1-difluoroethane (HFC 142b), 1,1,2-trichloro- 1,2,2-trifluoroethane (CFC 113), 1,2-dichloro-1,1,,2,2-tetrafluoroethane (CFC 114) and monochloropentafluoroethane. A mixture of any of the above is also useful. As chemical blowing agents, representative examples include azodicarbonamide, paratoluenesulfonylhydrazide and the like. Also a combination of a chemical blowing agent and a volatile organic blowing agent can be used, if desired.

A measure of an electroconductive material's ability to dissipate ESD, in addition to surface and volume resistivities, is the material's static decay rate. The static decay rate is the amount of time required for an electrically grounded sample of a material to dissipate a static charge induced on the surface of the sample. In regards to the present invention, the shorter the time required, the better the ability of the foam to dissipate the charge, and the more conductive the polymer. The static decay rate as described herein is measured according to Federal Test Method Standard No. 101C, Method 4046.1.

Various enhancers may be added to the composition of the present invention, most particularly to improve the static decay rate. Examples of such enhancers may include POLYMEG 650 (polytetramethylene ether glycol) available from QO Chemicals, Inc. of Des Plaines, Ill., DBEEA (dibutoxy ethoxy ethyl adipate) available from CP Hall Co. of Chicago, Ill., and TEGMER 804 (tetraethylene glycol di-2-hyphenethylhexoate) available from CP Hall Co.

The following foamed compositions were prepared and various measurements taken, thereby illustrating the benefits and advantages of the present invention. Examples 1–3 illustrate conventional foams not part of the present invention, comprising conductive carbon black and an absence of an ionic salt. One embodiment of the present invention is described in Example 4. Table I. below illustrates the respective electroconductive foam formulations of Examples 1–4 and their corresponding properties.

surface resistivity of 1.38×10$^{11}$ ohms.

EXAMPLE 3

The carbon black, polyethylene, and ionomer of Example 1 were added together in respective amounts of 10, 40 and 50 percent. The same blowing agent was added in the same amount as in Example 1 to produce an extruded foam having an open cell content of 92.8 percent, density of 3.72 pcf (59.59 Kg/m$^3$), a static decay rate of 0.01 seconds, and a surface resistivity of 6.85×10$^7$ ohms.

EXAMPLE 4

The carbon black, polyethylene, and ionomer of Example 1 were added together in respective amounts of 7.5, 29.8 and 36.8 percent. In addition, an ECO copolymer available from Dow Chemical of Midland, Mich. designated as ECO XU 60766.02L, was added in an amount of 25.4 percent. Sodium tetraphenylboron (STPB) was added in an amount of 0.5 percent. The same blowing agent was added in the same amount as in Example 1 to produce an extruded foam having an open cell content of 91.7 percent, a density of 2.96 pcf (47.41 Kg/m$^3$), a static decay rate of 0.01 seconds, and a surface resistivity of 1.18×10$^8$ ohms.

TABLE I

ELECTROCONDUCTIVE FOAM FORMULATION

| Ex. | KETJEN Black[1] 600J | PE4005[2] | SURLYN[3] 8660 | ECO[4] XU 60766.02L | STPB | CFC 114[5] phr | Density (cured) pcf | Static Decay Rate Sec. | Surface Resistivity ohm/sq. | Open Cell % |
|---|---|---|---|---|---|---|---|---|---|---|
| 1 | 7.5 | 30 | 62.5 | — | — | 25 | 2.80 | fail | $1.98 \times 10^{14}$ | 76.6 |
| 2 | 8.6 | 34.4 | 57 | — | — | 25 | 4.07 | 0.01 | $1.38 \times 10^{11}$ | 87.3 |
| 3 | 10 | 40 | 50 | — | — | 25 | 3.72 | 0.01 | $6.85 \times 10^{7}$ | 92.8 |
| 4 | 7.5 | 29.8 | 36.8 | 25.4 | 0.5 | 25 | 2.96 | 0.01 | $1.18 \times 10^{8}$ | 91.7 |

[1]Conductive carbon black from Akzo Chemie America.
[2]Low density polyethylene available from Dow Chemical.
[3]Ionomer resin available from Du Pont Co.
[4]Ethylene carbon monoxide copolymer (10 percent CO) available from Dow Chemical.
[5]Blowing agent, 1,2-dichloro-1,1,2,2-tetrafluoroethane.

EXAMPLE 1

A foamable composition was prepared by mixing 7.5 percent (all component percentages herein are percent by weight of composition before addition of blowing agent) of KETJEN Black 600J conductive carbon black available from Akzo Chemie America; 30 percent low density polyethylene available from Dow Chemical Co. under PE4005; and 62.5 percent of an ionomer resin, SURLYN 8660 from Du Pont. A blowing agent, CFC 114, was added in an amount of 25 parts per hundred parts of composition, and the resulting mixture extruded using a 1¼ inch (3.175 cm) extruder to produce a foam having an open cell content of 76.6 percent. The density of the cured, extruded sample was 2.80 pcf (44.85 Kg/m$^3$). The static decay rate of the sample was so slow it was unacceptable. The surface resistivity of the sample was 1.98×10$^{14}$ ohms.

EXAMPLE 2

The carbon black, polyethylene, and ionomer of Example 1 were added together in respective amounts of 8.6, 34.4 and 57 percent. The same blowing agent was added in the same amount as in Example 1 producing an extruded foam having an open cell content of 87.3 percent, a density of 4.07 pcf (65.19 Kg/m$^3$), a static decay rate of 0.01 seconds and a

SIGNIFICANCE OF EXAMPLES 1–4

Example 4 illustrates the effect of the addition of the ionic salt and ECO copolymer combination of the present invention to a polymeric resin having conductive carbon black particles. The use of only 0.5 percent of STPB and 25.4 percent of an ECO copolymer in Example 4 produced a foam having nearly identical open cell content and surface resistivity as the foam in Example 3 having approximately a 33 percent higher concentration of carbon black and a 25 percent higher density. Comparing the foam of the present invention in Example 4 to the foams of Examples 1 and 2, it is apparent that dramatic increases in conductivity are achieved by the incorporation of an ionic salt such as STPB and an ECO copolymer according to the teachings of the present invention.

Of course, it is understood that the foregoing is merely a preferred embodiment of the invention and that various changes and alterations can be made without departing from the spirit and broader aspects thereof as set forth in the appended claims, which are to be interpreted in accordance with the principles of patent law, including the Doctrine of Equivalents.

The embodiments of the invention in which an exclusive property or privilege is claimed are defined as follows.

1. A polymeric resin suitable for forming an electroconductive foam, said resin comprising:

from about 0.5 percent to about 15 percent of a conductive ionic salt, said salt selected from the group consisting of sodium tetraphenylboron, lithium perfluoroalkane sulfonate, potassium perfluoralkyl sulfonate, sodium thiocyanate, sodium trifluoromethane sulfonate, lithium trifluoromethane sulfonate, and combinations thereof;

a polymer capable of complexing said conductive ionic salt., said polymer selected from the group consisting of a copolymer of ethylene and carbon monoxide, polyethers, polyesters, polyamides, polyurethanes, polyvinyl chlorides, polyaldehydes, and combinations thereof; and an effective amount of particulate conductive material, said particulate conductive material selected from the group consisting of carbon black, finely divided metal particles, and combinations thereof, wherein said effective amount of said particulate conductive material is such that a foam formed from said resin is sufficiently electrically conductive to dissipate static electricity.

2. A polymeric resin in accordance with claim 1 wherein said polymer is a copolymer of ethylene and carbon monoxide.

3. A polymeric resin in accordance with claim 2 wherein said copolymer of ethylene and carbon monoxide has from about 1 to about 45 mole percent of CO units.

4. A polymeric resin in accordance with claim 3 wherein said copolymer of ethylene and carbon monoxide has from about 10 to about 20 mole percent of CO units.

5. A polymeric resin in accordance with claim 1 wherein said particulate conductive material is carbon black and is present in said resin in an amount of from about 5 percent to about 10 percent by weight.

6. A polymeric resin in accordance with claim 1 wherein said ionic salt has a concentration of from about 6 percent to about 10 percent.

7. A polymeric resin in accordance with claim 6 wherein said ionic salt is sodium tetraphenylboron.

8. A polymeric resin in accordance with claim 1 wherein said ionic salt is sodium tetraphenylboron.

9. A polymeric resin in accordance with claim 8 wherein said ionic salt is present in said resin in an amount of from about 0.5 to about 10 percent by weight.

10. A polymeric resin in accordance with claim 1 wherein said polymer is a copolymer of ethylene and carbon monoxide, said copolymer has from about 1 to about 45 mole percent CO units, and said ionic salt is sodium tetraphenylboron.

11. A polymeric resin in accordance with claim 1 wherein said resin has an overall melt index of from about 0.5 to about 5.0.

12. A polymeric resin in accordance with claim 11 wherein said resin has an overall melt index of from about 1.0 to about 3.0.

13. A lightweight electroconductive foam comprising:

from about 0.5 percent to about 15 percent of a conductive ionic salt, said salt selected from the group consisting of sodium tetraphenylboron, lithium perfluoroalkane sulfonate, potassium perfluoralkyl sulfonate, sodium thiocyanate, sodium trifluoromethane sulfonate, lithium trifluoromethane sulfonate, and combinations thereof;

a polymer capable of complexing said conductive ionic salt, said polymer selected from the group consisting of a copolymer of ethylene and carbon monoxide, polyethers, polyesters, polyamides, polyurethanes, polyvinyl chlorides, polyaldehydes, and combinations thereof; and an effective amount of particulate conductive material, said particulate conductive material selected from the group consisting of carbon black, finely divided metal particles, and combinations thereof, wherein said effective amount of said particulate conductive material is such that said foam is sufficiently electrically conductive to dissipate static electricity.

14. A lightweight electroconductive foam in accordance with claim 13 wherein said polymer is a copolymer of ethylene and carbon monoxide.

15. A lightweight electroconductive foam in accordance with claim 14 wherein said copolymer of ethylene and carbon monoxide has from about 1 to about 45 mole percent of CO units.

16. A lightweight electroconductive foam in accordance with claim 15 wherein said copolymer of ethylene and carbon monoxide has from about 10 to about 20 mole percent of CO units.

17. A lightweight electroconductive foam in accordance with claim 13 wherein said particulate conductive material is conductive carbon black.

18. A lightweight electroconductive foam in accordance with claim 13 wherein said ionic salt has a concentration of from about 6 percent to about 10 percent.

19. A lightweight electroconductive foam in accordance with claim 18 wherein said ionic salt is sodium tetraphenylboron.

20. A lightweight electroconductive foam in accordance with claim 13 wherein said ionic salt is sodium tetraphenylboron.

21. A lightweight electroconductive foam in accordance with claim 20 wherein said ionic salt is present in said foam in an amount of from about 0.5 to about 10 percent by weight.

22. A lightweight electroconductive foam in accordance with claim 13 wherein said foam has a density of from about 0.6 pcf to about 12.0 pcf.

23. A lightweight electroconductive foam in accordance with claim 13 wherein said foam has a surface resistivity of less than about $10^{10}$ ohms per square.

* * * * *